United States Patent Office 3,424,051
Patented Jan. 28, 1969

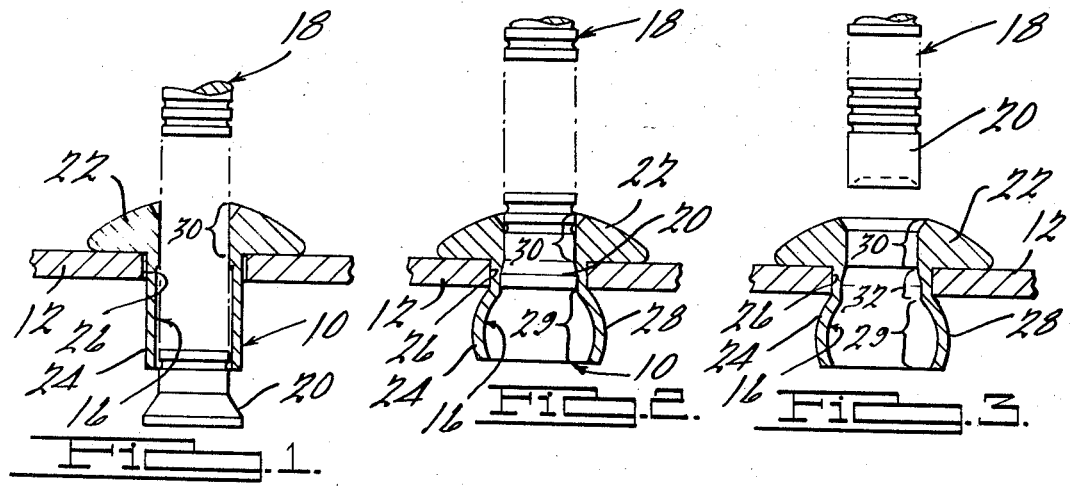
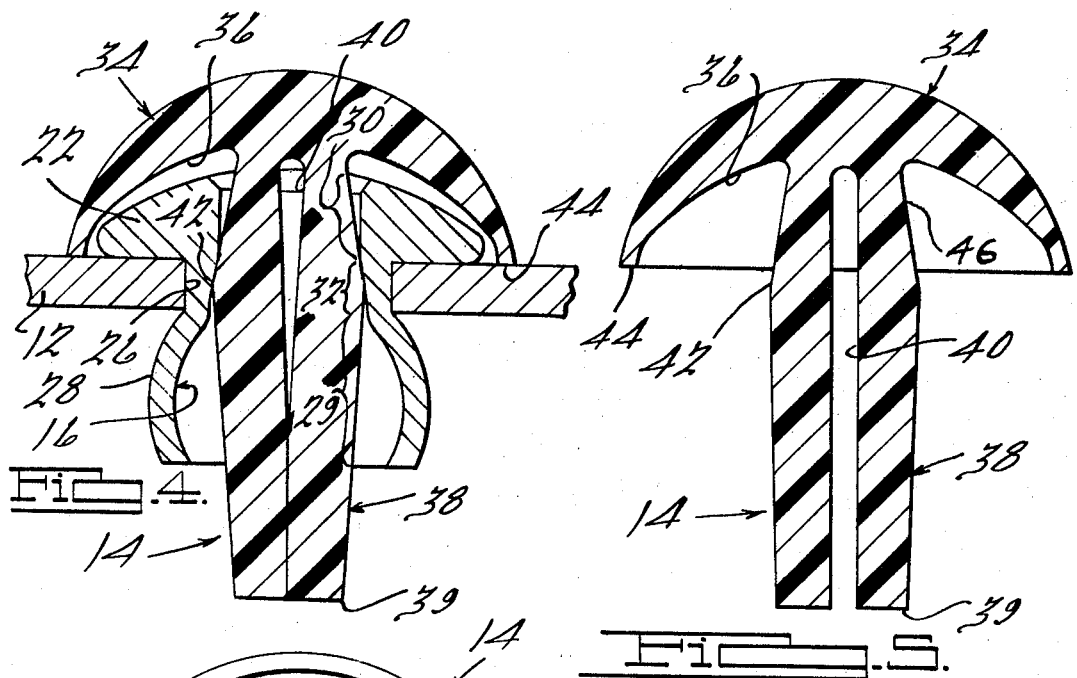
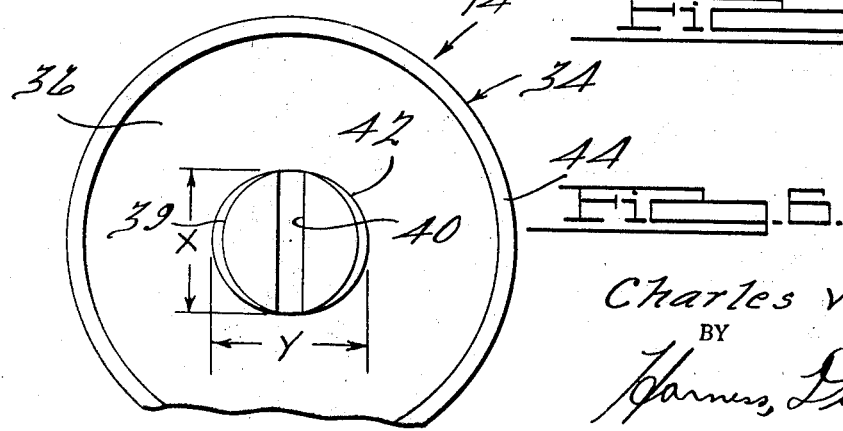

3,424,051
HOLLOW FASTENER AND PLUG ASSEMBLY
Charles W. Baugh, St. Clair Shores, Mich., assignor to Huck Manufacturing Company, Detroit, Mich., a corporation of Michigan
Filed Mar. 20, 1967, Ser. No. 624,578
U.S. Cl. 85—77                                     7 Claims
Int. Cl. F16b 13/04, 19/00; A44b 17/00

ABSTRACT OF THE DISCLOSURE

A resilient plug for filling the opening in a hollow rivet with the plug including a cap for covering one end of the rivet and having a stem cooperating with the cap and the hollow rivet for resiliently retaining the plug and rivet together.

---

The present invention relates to a plug construction for filing the opening of a hollow rivet and more particularly to a combination hollow rivet and plug construction.

The plug of the present invention is used to fill the opening of a hollow rivet and for the purpose of appearance.

It is an object of the present invention to provide a novel plug construction for filling the opening of a hollow rivet.

It is another object of the present invention to provide a novel combination of a hollow rivet and a plug for filling the opening in the rivet.

Other objects, features, and advantages of the present invention will become apparent from the subsequent description and the appended claims, taken in conjection with the accompanying drawings, in which:

FIGURE 1 is a side elevational view with some parts shown in section of a blind rivet assembly including a pin and a sleeve prior to the sleeve being set;

FIGURE 2 is a view showing the blind rivet assembly of FIGURE 1 after the rivet has been partially set;

FIGURE 3 is a view similar to FIGURES 1 and 2 of the blind rivet assembly after the rivet has been set;

FIGURE 4 is an elevational view to increased scale similar to those of FIGURES 1 through 3, showing the set sleeve having a plug or cap located therein;

FIGURE 5 is an enlarged sectional view of the plug of FIGURE 4 prior to its assembly in the sleeve of FIGURE 4; and FIGURE 6 is an end view of the plug of FIGURE 5.

Looking now to FIGURE 4, a hollow sleeve 10 is shown in its set condition and assembled to a workpiece or plate 12 and a plug or cap 14 is shown located in the opening or bore 16 through the sleeve 10.

FIGURES 1 to 3 depict the sleeve 10 as it is being set. The sleeve 10 is a part of a fastener assembly originally including a pin member 18 which has an enlarged head 20 located at the blind or shank end of the sleeve 10. The sleeve 10 itself has an enlarged head portion 22, which is located against one side of the plate 12 to which it is to be secured. Sleeve 10 has a shank portion 24 which is located within a hole 26 in the workpiece 12 in clearance relationship therewith. In setting the fastener, the pin 18 is pulled relative to the sleeve 10 (by means well known in the art). As the head 20 is moved through the shank portion 24, the shank portion 24 is expanded outwardly to form a bulbed head 28. As the head 20 is moved further axially through the bore 16 in the sleeve 10, the portion of the shank 24 located in alignment with the hole 26 is expanded radially outwardly to fill the hole 26. After this occurs, that portion of the shank 28 of the sleeve 10 is incapable of further radially outward expansion; however, the pin 18 is made of material which will wire draw and as the head 20 passes through that portion of the bore 16 in alignment with the aperture 26, the head 20 is wire drawn and is reduced in diameter. The bore 16 through the sleeve 10 is originally generally of a uniform diameter through the shank portion 24 and is of a slightly reduced diameter through the head portion 22, as indicated by the portion 30 (see FIGURE 1). As the pin head 20 is moved through the bore 16 and into the reduced diameter portion 30, the head portion 22 being of a substantial section radially, generally will not expand radially outwardly as did the shank portion 24 with the result that the head 20 will be further reduced in size (by wiring drawing) as it is moved through the bore 16. In FIGURE 3 the pin 18 is shown as having been pulled completely through the sleeve 10 which has then been completely set to the workpiece 12.

As a result of the setting operation, the bore 16 through the sleeve 10 effectively comprises three portions. A maximum diameter portion 29 is located at the bulbed portion 28 of the shank 24, while the minimum diameter portion 30 is located in the head portion 22. An intermediate diameter portion 32 is located in alignment with the aperture 26 in the workpiece 12 and is of a diameter greater than that of the bore portion 30 but less than that of the bore portion 29. The plug 14 is located in the bore 16 and generally closes the bore 16 and covers the head portion 22. The cap is of a construction to tightly fit within the bore 16 so that it will not shake loose and at the same time can be used for sleeves such as sleeve 10 having shank portions such as portion 24 varying in length for use with varying thicknesses of workpieces 12.

Looking now to FIGURES 5 and 6, the plug 14 has a cap portion 34 which has a generally arcuate concave cavity 36 on its underside of a size to accept the head portion 22 of the sleeve 10. The plug 14 has a stem or shank 38 which is split by means of a longitudinally extending slot 40. The plug 14 is made of a resilient plastic material and hence the two portions of the shank 38 can be moved together to close slot 40 and upon release will spring back to the shape as shown in FIGURE 5. The outer surface of the stem 38 defines a maximum section at the point 42 (see FIGURE 6) with the outer surface portions opposite the slot 40 tapering to define reduced sections at the outer extremity 39 and at the inner extremity 46. In the point 42 of maximum section the outer surface generally defines an ellipse having a minor diameter X which is slightly less than the minimum diameter of the bore 16 (at bore portion 30) through the sleeve 10. The major diameter Y at point 42, with the two portions of the stem 38 in their natural positions as shown in FIGURE 5, is larger than the diameters of bore portions 30 and 32. When the portions of stem 38 are moved into engagement, i.e., slot 40 closed, the major diameter Y at the point 42 is generally the same as the minimum diameter portion 30.

The distance from the innermost extremity 44 of the head portion 34 to the maximum diameter point 42 of the stem 38 is selected such that with the extremity 44 in engagement with the outer surface of the workpiece 12 the maximum diameter point or portion 42 will be located within the intermediate diameter portion 32 which is in alignment with the opening 26 through the workpiece 12. Thus the plug 14 can be snapped into the opening 16 and once the maximum diameter portion 42 is moved past the minimum diameter bore portion 30 of the bore 16 and into intermediate bore section 32, the resilience of the shank 38 will cause the portions of the shank 38 to move apart whereby the plug 14 will be locked to the sleeve 10. Since the major diameter Y is normally greater than the diameter of intermediate bore portion 32, the portions of the stem 38 will not completely return to their normal positions of FIGURE 5 but will be resiliently in engagement with the inner surface of the bore 16. With the portions of the stem 38 tending to spread apart the tapered portion 46 will tend to axially move the shank 38 of the plug 14 further into the bore 16 and hence will enhance the locking of the plug 14 and sleeve 10 together.

By locating the maximum section point 42 relative to the extremity 44 of the cap portion 34 to be in alignment with the intermediate diameter bore portion 32 (which is in alignment with the opening 26 of the workpiece 12), the operation of the plug 14 will be unaffected by the length of shank portion 24 and can be utilized with sleeves 10 having longer shank portions 24 for securing together workpieces 12 of varying thickness. If, for example, the maximum diameter or section point 42 were spaced further axially from the extremity 44, it would be located in large diameter portion 32. For workpieces 12 of lesser thickness the maximum diameter point 42 could be out of engagement with the inside wall of the sleeve 10 thereby permitting relative axial movement of the plug 14 within the bore 16. Thus if the point 42 were selected to fall within the confines of the large diameter bore portion the plug 14 could be tightly held for one thickness of workpiece 12 and loose for a different thickness. With the construction as shown the maximum diameter portion 42 is designed to always be located within the intermediate diameter bore portion 32 which is in alignment with the aperture 26 and hence the plug 14 can be utilized with sleeves 10 having shanks 24 varying in length for securing together workpieces 12 varying in thickness.

While it will be apparent that the preferred embodiment of the invention disclosed is well calculated to fulfill the objects above stated, it will be appreciated that the invention is susceptible to modification, variation and change without department from the proper scope or fair meaning of the subjoined claims.

What is claimed is:

1. In an assembly including a fastener adapted to be located in an opening through a workpiece with the fastener comprising a sleeve with a through bore and with the bore having a small diameter portion and a larger diameter portion located in alignment with the opening, said sleeve having an enlarged head at one end thereof, a plug member for plugging the bore, said plug member comprising a head portion adapted to generally cover the sleeve on the one side of the opening closest to said small diameter portion and a stem portion adapted to be located within the bore, said stem portion being of a resilient construction and having an enlarged section portion normally larger than the section of the small diameter portion, a reduced section portion adjacent said enlarged section portion having an axial extent greater than that of said small diameter portion, said enlarged section portion being a preselected distance from said head portion to positively locate said enlarged section portion in engagement with said larger diameter portion and to locate said reduced section portion within said small diameter portion when said plug is assembled to the sleeve whereby said stem portion is resiliently reduced in size as said enlarged section portion is moved into the small diameter portion and resiliently expands in size as said enlarged section portion moves into engagement with said larger diameter portion to provide a lock between said plug and sleeve.

2. The apparatus of claim 1, with said enlarged head located on the one side and containing the small diameter portion and with the sleeve having a shank portion extending through the opening and terminating on the other side in a bulbed head whereby the sleeve is held to the workpiece and with said head portion having a concave inner surface for generally receiving the enlarged head.

3. The apparatus of claim 1 with said head portion on said plug member having a terminating surface engageable with the workpiece on the one side and with said preselected distance being measured from said terminating surface to said enlarged section portion.

4. The apparatus of claim 3 with said stem portion having a longitudinally extending slot for permitting reduction in the section of said enlarged section, said enlarged section in its normal condition with said plug unassembled generally defining an ellipse having a minor diameter in a direction across said slot generally equal to the diameter of the small diameter portion and having a major diameter in a direction transverse to said slot generally greater than the diameters of the small and enlarged diameter portions, said major diameter generally being no greater than the diameter of said small diameter portion with said slot closed, said slot in its unassembled condition being of a generally uniform width.

5. The apparatus of claim 4 with said stem portion tapering to a reduced diameter transversely of said slot from said enlarged section to said head portion whereby the taper acts to resiliently hold said plug assembled to the sleeve and said terminating surface in engagement with the one side of the workpiece.

6. The apparatus of claim 4 with said stem portion tapering to a reduced diameter transversely of said slot from said enlarged section toward the free end of said stem portion.

7. The apparatus of claim 1 with said stem portion as unassembled having a generally uniform open slot extending axially therethrough with said slot being completely closed over at least a portion of its length upon assembly of said plug to the fastener.

References Cited

UNITED STATES PATENTS

| 2,154,993 | 4/1939 | Place | 85—5 |
| 2,983,008 | 5/1961 | Von Rath | 24—73 |

FOREIGN PATENTS

| 163,108 | 5/1955 | Australia. |
| 246,388 | 8/1963 | Australia. |
| 920,221 | 3/1963 | Great Britian. |

CARL W. TOMLIN, *Primary Examiner.*

R. S. BRITTS, *Assistant Examiner.*

U.S. Cl. X.R.

85—5, 5; 24—214

UNITED STATES PATENT OFFICE
CERTIFICATE OF CORRECTION

Patent No. 3,424,051

January 28, 1969

Charles W. Baugh

It is certified that error appears in the above identified patent and that said Letters Patent are hereby corrected as shown below:

Column 1, line 21, "filing" should read -- filling --. Column 3, line 38, "department" should read -- departing --; line 45, after "portion" cancel "located in alignment with the opening".

Signed and sealed this 17th day of March 1970.

(SEAL)
Attest:

Edward M. Fletcher, Jr.
Attesting Officer

WILLIAM E. SCHUYLER, JR.
Commissioner of Patents